(12) United States Patent
Shen et al.

(10) Patent No.: US 9,037,077 B2
(45) Date of Patent: May 19, 2015

(54) METHODS AND DEVICES FOR WIRELESS RELAYS

(75) Inventors: Gang Shen, Shanghai (CN); Wu Zheng, Shanghai (CN); Dongyao Wang, Shanghai (CN); Jimin Liu, Shanghai (CN); Wei Wang, Shanghai (CN); Feng Han, Shanghai (CN); Qi Jiang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 711 days.

(21) Appl. No.: 13/265,664

(22) PCT Filed: Apr. 21, 2009

(86) PCT No.: PCT/CN2009/000426
§ 371 (c)(1),
(2), (4) Date: Oct. 21, 2011

(87) PCT Pub. No.: WO2010/121395
PCT Pub. Date: Oct. 28, 2010

(65) Prior Publication Data
US 2012/0052795 A1    Mar. 1, 2012

(51) Int. Cl.
*H04B 7/15* (2006.01)
*H04W 72/04* (2009.01)
(Continued)

(52) U.S. Cl.
CPC ....... *H04W 72/0406* (2013.01); *H04B 7/15585* (2013.01); *H04L 1/1835* (2013.01);
(Continued)

(58) Field of Classification Search
CPC .................. H04W 72/0406; H04W 72/0426; H04W 84/047; H04W 92/20
USPC .......... 455/424, 426.1, 435.2, 436–444, 449, 455/450, 524, 525, 3.02, 427, 428, 430, 455/431, 7–9, 11.1, 12.1, 13.1, 13.2, 455/14–17; 370/328, 226, 293, 246, 274, 370/279, 315, 316, 492, 501
See application file for complete search history.

(56) References Cited

U.S. PATENT DOCUMENTS

2002/0196804 A1    12/2002   Ishiguro et al.
2004/0228288 A1*   11/2004   Seol et al. ...................... 370/252
(Continued)

FOREIGN PATENT DOCUMENTS

CN          1394002 A      1/2003
CN        101072424 A     11/2007
(Continued)

OTHER PUBLICATIONS

International Search Report for PCT/CN2009/000426 dated Jan. 28, 2010.
(Continued)

*Primary Examiner* — Dominic E Rego
(74) *Attorney, Agent, or Firm* — Fay Sharpe LLP

(57) ABSTRACT

A relay method and device, wherein the control signal and the data signal which are in the same subframe are directly sent to a lower level device respectively by an upper level device and a relay function device. In one example, the relay function device transmits data signal using subscriber special reference signal to make the lower level device estimate an access channel correctly; in another example, the relay function device carries out precoding of the data signal correlative with the access channel so as to cancel the influence of the access channel, thereby make the lower level device receive data signal correctly. Retransmission control signaling is sent to the lower level device in each subframe by the upper level device to ensure the fixed sequential relationship of feedback retransmission.

13 Claims, 3 Drawing Sheets

(51) Int. Cl.
  *H04B 7/155* (2006.01)
  *H04L 1/18* (2006.01)
  *H04L 1/00* (2006.01)
  *H04W 84/04* (2009.01)

(52) U.S. Cl.
  CPC ............ *H04L1/1854* (2013.01); *H04L 1/1887* (2013.01); *H04L 2001/0097* (2013.01); *H04W 84/047* (2013.01)

(56) References Cited

U.S. PATENT DOCUMENTS

| | | |
|---|---|---|
| 2006/0209756 A1* | 9/2006 | Kostic et al. ................... 370/329 |
| 2007/0110016 A1 | 5/2007 | Shen et al. |
| 2007/0223495 A1* | 9/2007 | Fukui ....................... 370/395.64 |
| 2008/0014968 A1* | 1/2008 | Yoon ........................ 455/456.5 |
| 2008/0192694 A1* | 8/2008 | Lee et al. ....................... 370/331 |
| 2008/0225964 A1* | 9/2008 | Han et al. ..................... 375/260 |
| 2008/0316954 A1 | 12/2008 | Zheng |
| 2009/0086689 A1* | 4/2009 | Hunt et al. .................... 370/338 |
| 2009/0088165 A1 | 4/2009 | Shen et al. |
| 2009/0279500 A1* | 11/2009 | Luo et al. ..................... 370/330 |
| 2010/0136997 A1* | 6/2010 | Palanki et al. ............. 455/452.1 |
| 2010/0177746 A1* | 7/2010 | Gorokhov et al. ............ 370/336 |
| 2010/0182903 A1* | 7/2010 | Palanki et al. ................ 370/225 |
| 2010/0216470 A1* | 8/2010 | Pamp et al. .................... 455/436 |
| 2010/0248726 A1* | 9/2010 | Kagimoto et al. ............ 455/437 |
| 2011/0142007 A1* | 6/2011 | Takada et al. ................. 370/331 |
| 2013/0250855 A1* | 9/2013 | Bhattad et al. ................ 370/328 |

FOREIGN PATENT DOCUMENTS

| | | |
|---|---|---|
| CN | 101127551 A | 2/2008 |
| CN | 101170351 A | 4/2008 |
| EP | 1890402 A2 | 8/2007 |
| WO | WO 2007/064249 A1 | 6/2007 |
| WO | WO 2007/128209 A1 | 11/2007 |
| WO | WO2008051605 A2 | 5/2008 |

OTHER PUBLICATIONS

Shen, et al., "Recommendation on 802.16 MMR with Backward Compatibility," IEEE 802.16 Session #40, Vancouver, Canada, Nov. 11, 2005, pp. 1-6.

Zhang, et al., "Some Considerations on Mobile Multi-hop Relay Based System," IEEE C802.16j-06/002, Tel Aviv, Israel, Apr. 30, 2006, pp. 1-12.

* cited by examiner

| Time slot | 0 | 1 | 2 | 3 | 4 | 5 | 6 | 7 | 8 | 9 |
|---|---|---|---|---|---|---|---|---|---|---|
| Configuration 4 | D | S | U | U | D | D | D | D | D | D |
| ACK/NAK | 2 | 2 | 8 | 9 | 2 | 2 | 3 | 3 | 3 | 3 |
| GRANT | | | | | | | | | 2 | 3 |

METHODS AND DEVICES FOR WIRELESS RELAYS

FIELD OF THE INVENTION

The present invention relates to wireless communication system, more particularly, to wireless relay network.

BACKGROUND OF THE INVENTION

The LTE-Advanced relay technology requires relay stations to provide backward compatibility for user equipments (abbreviated as UE) of Release 8, that is, LTE-Advanced relay scheme should support the legacy UE of Release 8 without any change to UE, in such case, there are some technical challenges accordingly:

Firstly the legacy UE is designed without consideration of relay, thus it can not be aware of the existence of relay station, which adds difficulty to the design of relay of LTE-Advanced.

Secondly, as relay concept is introduced, some uplink/downlink subframes or timeslots have to be reserved for Backhaul resources between base stations and relay stations. When relay stations receive data from base stations, such subframes or times lots are kept blank, which can not be used to transmit any symbols or data to UE, while present Release 8 assumes each subframe contains reference symbol, and UE estimates channels in a whole time-frequency grid by interpolating/averaging a plurality of reference symbols and reduce noise in channel estimation. It is expected that when UE measure reference symbols at downlink subframes which is preset to be blank, the zero value will be measured, which will result in error or failure of the whole channel estimation.

Thirdly, under the HARQ (Hybrid Automatic Repeat reQuest) mechanism, data transmission and ACK/NACK feedback have fixed timing relation. Because some uplink/downlink sub frames or timeslots are reserved for backhaul and cannot be used by UK, it may cause that after sender transmits codeword, no transmission of corresponding ACK/NACK feedback at anticipated subframes or timeslots is sent by the receiver side and no feedback is received at sender side consequently. The ACK/NACK collision may cause inefficient operation such as unnecessary retransmission. Such frequent "non-access" subframes lead to great difficulties to retain the fixed timing relation between HARQ transmission and ACK/NACK feedback. Furthermore, in each radio frame (10 ms for a period), the subframes #0, #4, #5 and #9 in FDD system and #0, #1, #5 and #9 in TDD system carry P-BCH (primary broadcast channel), P-SCH (Primary Synchronization Channel), S-SCH (Secondary Synchronization Channel), etc. for UE and thus can not be used for relay backhaul link, such limitation causes more difficulties to maintain HARQ timing.

At present there is a fake MBSFN subframe relay method, the downlink part of which is illustrated in FIG. 1. Wherein, during backhaul, RN will configure some downlink subframe as downlink MBSFN subframe toward UE and receive the data information from eNB in the subframe. UE does not use the reference signal received from the MBSFN subframe for channel estimation between eNB and UE, thus RN can communicate with eNB by these subframe, which does not affect channel estimation of UE. When communicating with UE, RN transmits information of PDCCH (Packet Dedicated Control Channel) and PHICH (Physical HARQ Indicator Channel) information on the basis of cell-specific reference signals of the RN (abbreviated as RN CRS), which causes legacy UE identifies the RN as eNB and receives data signal which is accompanied by RN CRS. RN blanks some uplink subframe by proper scheduling for uplink transmission, while both backhaul link and access link run with a same existing TDD uplink/downlink configuration, i.e., the same downlink subframe and uplink subframe allocation, the same HARQ timing and the same downlink grant association.

The fake MBSFN subframe relay method has some defects (R1-090827): firstly, UE does not estimate the subframe configured as MBSFN subframe, which affects the continuity and integrality of the estimation. Secondly, TDD time slot configurations will affect the efficiency of access link and performance of communication of the method, for instance, when an uplink subframe is used for the backhaul link transmission from RN to eNB, the subframe in access link must be configured as "MBSFN" and be blanked. Consequently, after downlink data is transmitted in downlink subframe, the feedback of downlink data HARQ from UE in uplink subframe cannot be received by RN, which is expected to be received by RN originally, such HARQ feedback loss will lead to the waste of time-frequency resource, i.e. the downlink subframe can not transmit PDSCH. TDD configuration 4 is considered as an example, as illustrated in FIG. 2, wherein the HARQ feedback of subframes #0, #1, #5 and #6 are carried either on subframe #2 or #3 according to Rel-8 specification. When the fake MBSFN subframe method is in use, since at least one of subframe #2 or #3 has to be used by the backhaul link, HARQ feedback from at least one of UEs cannot be received by the RNs which uses subframe of #0, #1, #5 and #6 to transmit downlink data.

In addition, TDD configuration 0 and configuration 5 are not applicable to TDD relay, because sub-frame #0, #1, #5 and #6 cannot be used for MBSFN due to P-BCH, P-SCH and S-SCH for configuration-0, and the only uplink sub-frame #2 cannot be occupied for configuration-5.

Furthermore, R1-091403 provides a method of data retransmission assisted by RN: base station sends data signal to UE directly, simultaneously RN monitors the data signal sent from base station and demodulates and decodes the data signal, then restores original information; when UE demodulates and decodes the data signal received from base station incorrectly, base station will retransmit the data signal to UE according to HARQ rule, simultaneously RN generates the data signal which is corresponding to the original information and has the same format as sent by base station, then the data signal will be sent to UE, the data signals sent by base station and RN overlap in space, which causes UE demodulates and decodes original information properly with much larger probability.

The solution has some defects (3GPP RAN1 #56bis, March 2009): the solution is limited to assist HARQ to retransmit data only, rather than obtaining relay gain by high order modulation and coding of relay link of a relay communication method in general, moreover, only less than or equal to 30% of HARQ service requires retransmission according to statistics, so the utility efficiency of the solution is lower. In addition, as for relay wireless network, channel quality between base station and UE is bad usually; while in R1-91403 solution, base station must communicate with UE by bad channel, in the scenario low order coding and modulation has to be assumed, therefore the communication between RN and UE must assume low order communication mode which is employed by base station also, thus the capacity based on the communication method is lower.

SUMMARY OF THE INVENTION

Obviously, when RN is introduced, it's very advantageous to propose a relay method which does not change existing UE. It is imperative for the relay method to ensure proper reception of data signal by UE in the relay channel; the same time sequence relation of data transmission and retransmitting feedback should be also ensured by the relay method, which should support HARQ retransmission mechanism and reduce waste of resource.

In an aspect of the invention, a method is provided in a first superior device for communicating with a subordinate device in cooperation with a second superior device, the method comprises the following step of: iii. sending controlling information directly to said subordinate device in a preset time unit, said controlling information instructing said subordinate device to receive data information at least from said second superior device in said preset time unit.

Preferably, in order to satisfy at least one above requirement of relay technology, the method further comprises the following steps of: i. determining transmission instruction information for said second superior device to transmit said data information to said subordinate device, said transmission instruction information instructing said second superior device to transmit said data information to said subordinate device in said preset time unit; and ii. providing said transmission instruction information and said dada information for said second superior device.

In a second aspect of the invention, a method is provided in a second superior device for communicating with a subordinate device in cooperation with a first superior device, the method comprises the following steps of: I. obtaining transmission instruction information, which instructs said second superior device to transmit data information to said subordinate device in a preset time unit; II. keeping silent, or sending same controlling information as that sent by said first superior device, when said first superior device sends controlling information to said subordinate device in said preset time unit; and III. transmitting said data information to said subordinate device in said preset time unit.

Preferably, in order to satisfy at least one above requirement of relay technology, said step I further comprises: receiving said transmission instruction information from said first superior device.

In a third aspect of the invention, an apparatus is provided in a first superior device for communicating with a subordinate device in cooperation with a second superior device, the apparatus comprises a controlling means, which is configured to send controlling information directly to said subordinate device in a preset time unit, said controlling information instruct said subordinate device to receive data information at least from said second superior device in said preset time unit.

Preferably, in order to satisfy at least one above requirement of relay technology, the apparatus further comprises: a determining means, which is configured to determine transmission instruction information for said second superior device to transmit said data information to said subordinate device, said transmission instruction information instructs said second superior device to transmit said data information to said subordinate device in said preset time unit; and a providing means, which is configured to provide said transmission instruction information for said second superior device.

In a fourth aspect of the invention, an apparatus is provided in a second superior device for communicating with a subordinate device in cooperation with a first superior device, the apparatus comprises an obtaining means, which is configured to obtain transmission instruction information, which instructs said second superior device to transmit data information to said subordinate device in a preset time unit; and a transmitter, which is configured to transmit said data information to said subordinate device in said preset time unit; the apparatus keeps silent, or comprises a controlling means which is configured to send same controlling information as that sent by said first superior device, when said first superior device sends controlling information to said subordinate device in said preset time unit.

Preferably, in order to satisfy at least one above requirement of relay technology, said obtaining means is further configured to receive said transmission instruction information from said first superior device.

In another aspect of the invention, a method is provided in a communication coordinating device for a first superior device and a second superior device to communicate with a subordinate device collaboratively, the method comprises the following steps of: determining the transmission instruction information about that said second superior device sends data information to the subordinate device, the transmission instruction information instructs said second superior device to transmit data information to said subordinate device in a preset time unit; providing the transmission instruction information to the second superior device and inform the determined result to the first superior device. An apparatus is also provided in corresponding a communication coordinating device for a first superior device and a second superior device to communicate with a subordinate device collaboratively, the apparatus comprises: a determining means, which is configured to determine transmission instruction information for said second superior device to transmit said data information to said subordinate device, said transmission instruction information instructing said second superior device to transmit said data information to said subordinate device in said preset time unit; and a providing means, which is configured to provide said transmission instruction information for said second superior device and inform the determined result to the first superior device.

According to embodiments of the invention, different superior devices are responsible for send controlling signaling and data information respectively, which adds the flexibility of the system, for instance, the first base station obtains larger coverage for controlling signal by low-frequency carrier, while the second base station obtains larger throughput of data information by high-frequency carrier. The first or second base station or a communication collaborative device of the invention can be in charge of the collaborative control. Moreover, embodiments of the invention do not require much modification of UE and are of excellent backward compatibility.

According to preferred embodiments in relay technology of the invention, base station sends reference signals in each subframe, on the basis of which UE can estimate the channel completely; and base station can transmit controlling signaling e.g. retransmission feedback information to UE directly in each downlink subframe, which ensures the same time sequence relation between data transmission and retransmission feedback and supports HARQ retransmission mechanism and reduces waste of resource. In addition, preferred embodiment still set out that RN transmits data information on the basis of User-specific References signals (abbreviated as URS) or precoding, which causes that UE receives data information properly, meanwhile, no modification is required for UE and the invention are of excellent backward compatibility.

BRIEF DESCRIPTION OF DRAWINGS

The features, objects and advantages mentioned above or otherwise specified will become more apparent by reading the detailed description of non-limiting embodiments referred to accompanying drawings.

In the accompanying drawings, identical or like numerals indicate identical or like elements.

DETAILED DESCRIPTION OF EMBODIMENTS

The First Embodiment

Figures 1, 2:
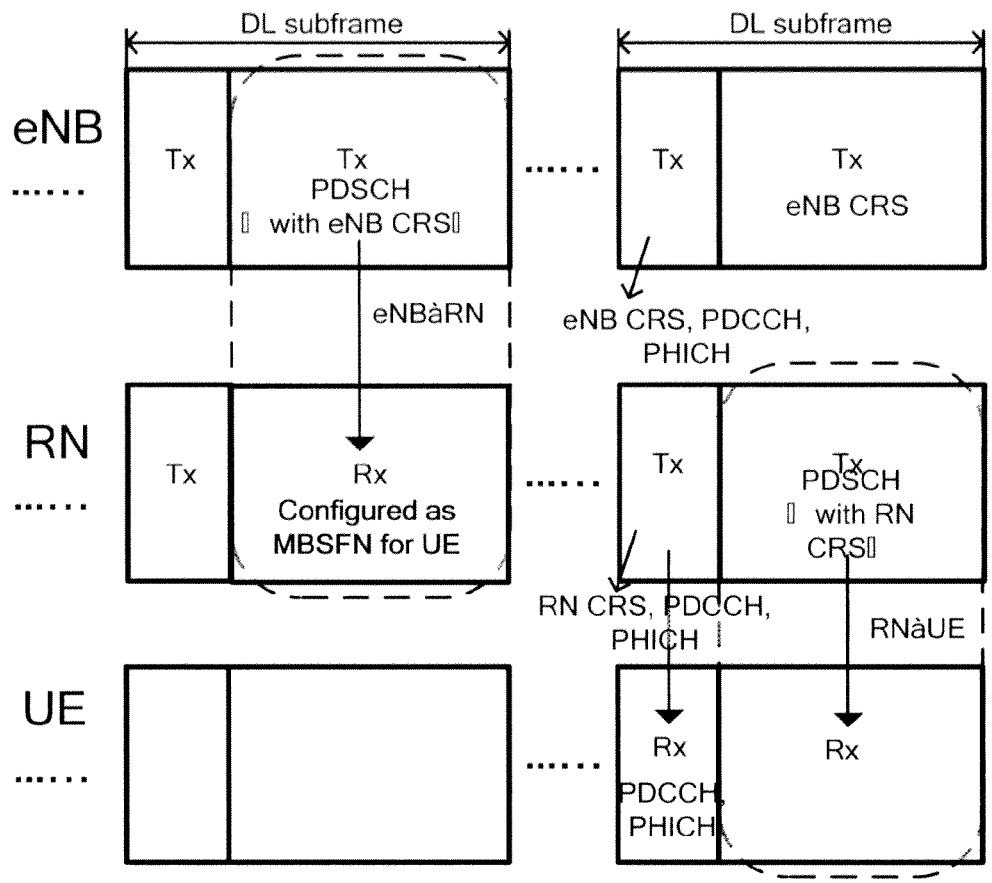
FIG. 1 is a schematic diagram of downlink relay communication of an existing fake MBSFN subframe relay method.
FIG. 2 is a schematic diagram of TDD configuration 4.
Figure 3:
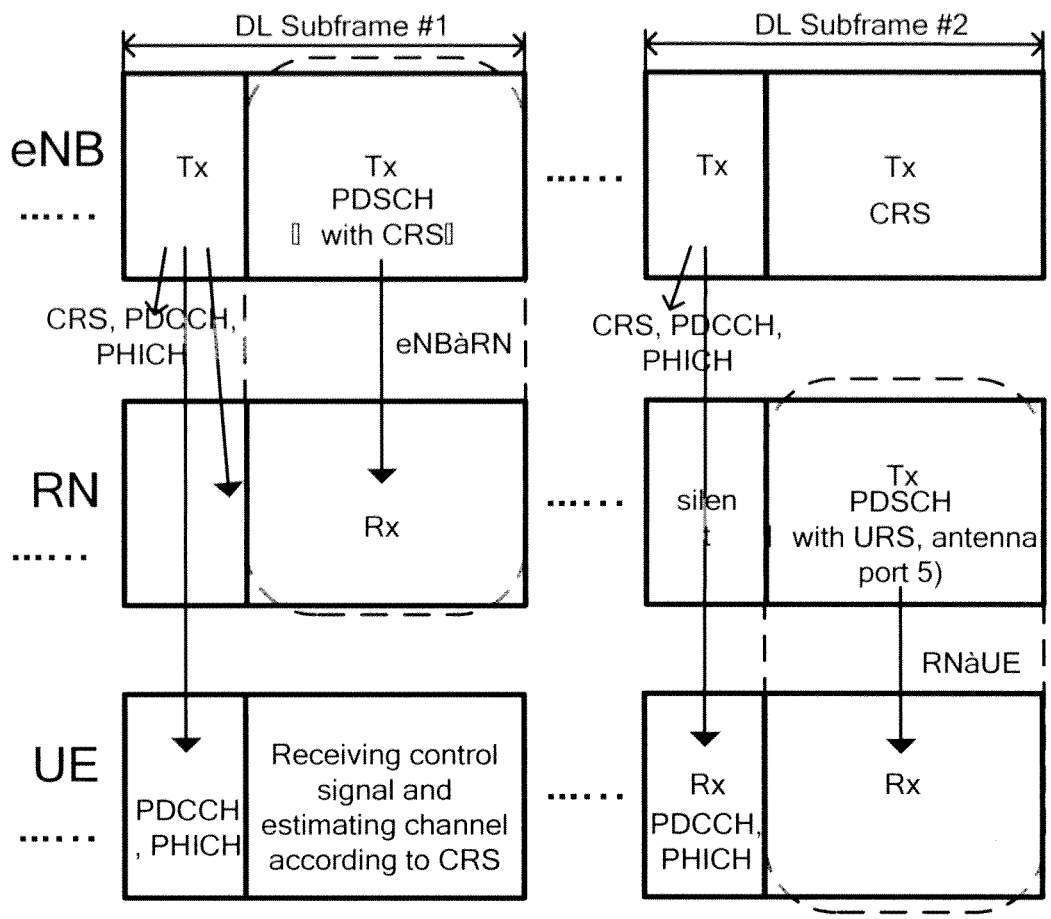
FIG. 3 is a schematic diagram of downlink relay communication based on an embodiment of the invention.

According to an aspect of the embodiment in the invention, the method of a first superior device and a second superior device collaboratively communicate with a subordinate device is specified as below.

In the embodiment, a first base station device eNB1 and a second base station device eNB2 collaboratively communicate with UE.

Firstly, eNB2 obtains transmission instruction information, which instructs eNB2 to transmit data information to UE in a preset subframe.

In one scenario, the transmission instruction information is provided by eNB1:

eNB1 determines that eNB2 transmits data information to UE in a preset subframe;

then eNB1 transmits the corresponding instruction information to eNB2.

In another scenario, the transmission instruction information is provided by a third party communication coordinating device:

the communication coordinating device determines that eNB2 transmits data information to UE in a preset subframe;

then the communication coordinating device transmits the corresponding instruction information to eNB2 and informs the determined result to the first superior device.

Then eNB1 sends controlling information to UE directly in downlink controlling information part of the preset subframe, the controlling information instructs UE to receive data information from eNB2 in the preset subframe.

Meanwhile, eNB2 keeps silent to avoid interference of controlling signal; or sends the same controlling signal as eNB1 sent, to produce a certain gain of signal overlap.

Later, eNB2 transmits data information to UE in the preset subframe. Meanwhile, preferably, eNB1 transmits the same data information to UE simultaneously, to produce a certain gain of signal overlap. Preferably, eNB1 can keep silent. Preferably, eNB1 can serve for other users to obtain gain of frequency reuse.

UE will detect the received data signal and restore the original data information.

According to embodiment of this aspect of the invention, two base stations transmit controlling signaling and data information to UE respectively, on occasion of synchronization and being controlled by controlling signaling of one base station, users can receive data information from another base station. One typical example is that the first base station obtains larger coverage for controlling signal by low-frequency carrier, while the second base station obtains larger throughput of data information by high-frequency carrier. It can be appreciated by those skilled in the art that this aspect of the invention is applicable to two relay stations to send controlling signaling and data information respectively in the same way; and it is also applicable to a base station and a relay station to transmit controlling signaling and data information respectively.

As for relay technology, the invention provides preferred technical solution elucidated by a second embodiment as below.

The Second Embodiment

According to an embodiment of the invention, the process of that the RN relays the data information from eNB to UE, in a relay network based on LTE-A protocol, will be specified as below. It should be appreciated that the scenario mentioned does not limit the invention, and the invention is still applicable to other protocols and relay scenarios, for instance, RN2 relays the data information from RN1 to UE.

Firstly, in step of S1, by scheduling, eNB determines the preset subframe which is used for transmitting the data information from RN to UE, for instance, eNB schedules RN to transmit data information to UE in downlink subframe #2. Preferably, eNB further determines subcarrier, time slot, etc. in downlink subframe #2 which is used for transmitting the data information from RN to UE.

Later, in step of S2, eNB transmits transmission instruction information as a result scheduled by eNB to RN through a control channel e.g. PDCCH, the transmission instruction information is the preset downlink subframe #2, subcarrier and time slot on which the RN transmits the data information. It should be appreciated that the information e.g. PDCCH, PHICH sent by eNB is accompanied by Cell-specific Reference Signals (abbreviated as CRS) of eNB.

It can be appreciated that like what is set out in the first embodiment, a communication coordinating device can also determines the preset subframe used for transmitting the data information from RN to UE by scheduling, and informs the corresponding transmission instruction information to RN and informs the scheduling result to eNB.

Then eNB transmits data information to RN by PDSCH accompanied by CRS in the same subframe.

Simultaneously, in step S3, RN receives the transmission instruction information from eNB and transmits data information to UE.

Later, in step S4, eNB transmits the controlling information e.g. SCH, BCH and PDCCH to UE directly in the next subframe #2. The PDCCH comprises the instruction information which instructs UE to receive data information in a subcarrier and a time slot of the present subframe. And the PDCCH comprises the instruction information which instructs UE to receive data information on the basis of User-specific Reference Signals (abbreviated as URS). Simultaneously, RN keeps silent and does not allow transmission of CRS, PCDCH, SCH, BCH, etc; in another scenario, RN transmits the same controlling signals as transmitted by eNB, which produces a certain gain of signal overlap.

Thus, after UE receives the controlling information transmitted by eNB, UE will be aware that it is to receive data information on the basis of URS in some subcarrier and time slot of the downlink sub frame #2.

In step of S5, RN transmits data information to UE in the determined subcarrier and time slot in the downlink subframe #2, on the basis of transmission instruction information provided by eNB in downlink subframe #1.

Specifically, for the purpose of correct estimation of the downlink channel from RN to UE executed by UE, RN transmits PDSCH carrying data information via antenna port 5. Antenna port 5 is one User-specific Reference Signals and one reference signal used for beam forming, all the present UEs are aware of the form of the reference signal in advance. Preferably, the first base station device eNB1 can transmit the same data information as sent by RN to UE simultaneously to produce a certain gain of signal overlap. Preferably, the first base station device eNB1 can keep silent. Preferably, the first base station device eNB1 can serve for other users simultaneously to obtain gain of frequency reuse.

Thus, in step of S6, UE can estimate the channel from RN to UE accurately without any distortion of estimation, by receiving and measuring URS of PDSCH which is transmitted by RN. After the channel estimation, UE can demodulate and decode the data information of PDSCH better then restore the original data successfully.

According to the embodiment, eNB obtains larger coverage for controlling signal by low-frequency carrier, while RN obtains larger throughput of data information by high-frequency carrier, which enhances flexibility and increases communication capacity of relay network.

It can be appreciated that in both above downlink subframe #1 and downlink subframe #2, base station device eNB can transmit SCH, BCH, PDCCH, PHICH and PDSCH signals which are accompanied by cell-specific reference signals CRS of eNB. UE can obtain the quality estimation of the channels of each subframe from eNB to UE on the basis of CRS, which ensures the continuity of the channel estimation for the whole frame. Moreover, compared with the MBSFN subframe configuration without subframe estimation by UE in the fake MBSFN subframe relay method, the embodiment can obtain more complete channel estimation.

In particular, UE transmits a HARQ uplink signal in a preceding uplink subframe, the HARQ ACK/NACK feedback information of the uplink signal should be feedbacked to UE in downlink subframe #1 or downlink subframe #2. Base station device eNB transmits the feedback information to UE in PHICH channel of downlink subframe #1 or downlink subframe #2, thus, the same time sequence relation of transmission of HARQ data and retransmission feedback is ensured. From the view of time, in a preceding uplink subframe, UE transmits HARQ data to RN and anticipates receiving ACK/NACK information from base station device eNB directly. After RN receives uplink data in uplink subframe, the data will be decoded in the next first subframe then be forwarded to base station device eNB in the next second subframe; the data will be decoded in the next third subframe by base station device eNB, and ACK/NACK feedback which indicates the reception is proper or not will be transmitted to UE in the next fourth subframe, i.e. downlink subframe #1 or downlink subframe #2, the whole latency is 4 ms, which satisfies the requirement specified in LTE-A, i.e. the required minimum time is 4 ms. Hence, it is feasible for UE to receive ACK/NACK feedback in the anticipated subframe.

In the embodiment, although UE receives the PDSCH data information from RN, it still receives SCH, BCH, PDCCH and other controlling signals from base station device eNB and estimates the channel from base station device eNB to UE by CRS of eNB. In one scenario, base station device eNB transmits controlling information to UE and other user devices governed by the eNB, RN keeps silent and does not transmit any controlling information, e.g. CRS, hence RN has no cell ID and decreases the CRS interference; and RN does not transmit any SCH, BCH and PDCCH, thus interference of controlling signaling is decreased, especially for the interference of BCH and PDCCH; in another scenario, RN sent the same controlling signal as base station device eNB sent, which produces a certain gain of signal overlap. From the view of UE, it can only perceive the existence of base station device eNB, while RN is deemed as transparent device. It is not necessary for UE to experience handover procedure from eNB to RN or the reversed handover procedure.

In the embodiment, base station device eNB centrally schedules and controls all RNs and UEs within the cell governed by the eNB. RN has no scheduling and controlling functions, just following eNB's decisions. Base station device eNB determines and informs RN that which subframe, time slot and subcarrier will be used to transmit data information; and will inform UE that which subframe, time slot and subcarrier will be used to receive data information, and data information will be transmitted to RN in advance. Coding and modulating scheme will be determined by base station device eNB according to channel status. The centrally controlling method is easy to realize cooperative relay.

Compared with the existing fake MBFSN subframe relay method which is only applicable to several LTE-A TDD configurations, the method is applicable to LTE-A FDD and all TDD configurations, thus has better backward compatibility. Moreover, in the fake MBFSN subframe relay method, for each subframe reserved for eNB→RN transmission, at least 4 symbols in one frame are wasted, wherein 2 symbols are used for RN downlink transmission, another 2 symbols are used for gap. The embodiment avoids such unnecessary waste. In addition, in fake MBFSN subframe relay method, at least 4 downlink subframe has to be configured. Thus such scenario may occur that no downlink subframe is available for backhaul link. While there is no such limitation in the embodiment, furthermore, transmission of eNB→UE and transmission of RN→eNB can be carried out in one subframe simultaneously.

In the above embodiment, RN transmits the URS of antenna port 5 whereby UE carries out channel estimation for the downlink channel from RN to UE and then data information form RN to UE can be demodulated and decoded correctly. In another scenario, RN counteracts the effect of the downlink channel from RN to UE by precoding data information instead of transmitting URS.

Because UE can detect the channel status from base station device eNB to UE by CRS which is transmitted by base station device eNB, e.g. gain matrix $H_1$, in case RN makes s' become $H_1 \times s$ when s' reaches UE, wherein the s' is generated by RN after RN processes original data information s; then UE which has already carried out proper estimation on $H_1$ can demodulate then obtain the original signals.

In order to achieve the object, RN can precode data information according to $H_1$ and the information of the second channel which is from RN to UE, the precoding scheme makes the signal of the data information received by UE represent the gain of the first channel. In an embodiment, transmitting signal s' can be defined by the following formula:

$$s' = ((H_2^{-1} \times H_1) \times s$$

Wherein $H_2$ denotes a channel gain matrix of the second channel, i.e. the precoding matrix is $f_{precoding} = H_2^{-1} \times H_1$ Thus, after propagating in channels, data information received by UE is r:

$$r = H_2 \times s' + n = H_2 \times (H_2^{-1} \times H_1) \times s + n = H_1 \times s + n$$

Wherein, n denotes the noise of the second channel.

Preferably, the first base station eNB1 can transmit data signal s to UE simultaneously, UE will receive the signal of $r + H_1 \times s + n'$ whereby some gain of signal overlap is produced.

In an embodiment, base station device eNB instructs UE to measure and transmit information $H_1$ of the first channel from base station device eNB to UE, then UE measures and obtains $H_1$ on the basis of CRS of base station device eNB. Base station device eNB transmits the channel information $H_1$ as transmission instruction information to RN by PDCCH. RN will estimate the uplink channel according to the uplink signal from UE to RN; and determine the information $H_2$ of the second channel from RN to UE on the basis of symmetry of channels. Then RN can determine the precoding scheme $f_{precoding} = H_2^{-1} \times H_1$.

Similarly, in another embodiment, base station device eNB obtains channel information $H_1$ measured by UE; base station device eNB still instructs UE to compulsively measure signal quality of the second channel (specific subcarrier and time slot) to obtain $H_2$. In one scenario, base station device eNB transmits $H_1$ and $H_2$ as transmission instruction information to RN, RN calculates then obtains the precoding scheme $f_{precoding} = H_2^{-1} \times H_1$; in another scenario, base station device eNB calculates then obtains the precoding scheme $f_{precoding} = H_2^{-1} \times H_1$; and the precoding scheme $f_{precoding}$ will be transmitted to RN as transmission instruction information.

The method embodiments of the invention have been specified as above, and the apparatus embodiments of the invention will be specified as below.

The Third Embodiment

In the embodiment, the first base station device eNB1 and the second base station device eNB2 collaboratively communicate with UE. The first base station device eNB1 comprises an apparatus 1 which is used for communication with UE in cooperation with eNB2, the apparatus comprises a controlling means 12, and preferably further comprises a determining means 10 and a providing means 11. The second base station device eNB2 comprises an apparatus 2 which is used for communication with UE in cooperation with eNB1, the apparatus comprises an obtaining means 20 and a transmitter 21. In another scenario, the network still has a third party communication coordinating device, which comprises an apparatus 3 used for coordinating the first base station device eNB1 and the second base station to communicate with UE, and the apparatus comprises a determining means 30 and a providing means 31.

Firstly, the obtaining means 20 of the second base station device eNB2 obtains transmission instruction information, which instructs the second base station device eNB2 to transmit data information to UE in a preset subframe.

In one scenario, the transmission instruction information is provided by the first base station device eNB1:
  the determining means 10 of the first base station device eNB1 determines that base station device eNB2 to transmit data information to UE in a preset subframe.
  then the providing means 11 of the first base station device eNB1 transmits the corresponding instruction information to the second base station device eNB2.

In another scenario, the transmission instruction information is provided by the third party communication coordinating device:
  the determining means 30 of the communication coordinating device determines that the second base station device eNB2 transmits data information to UE in a preset subframe;
  then the providing means 31 of the communication coordinating device transmits the corresponding instruction information to the second base station device eNB2 and informs the determined result to the first superior device.

Then the controlling means 12 of the first base station device eNB1 transmits controlling information to UE directly in the downlink controlling information part of the preset subframe, the controlling information instructs UE to receive the data information from the second base station device eNB2 in the downlink data information part of the preset subframe.

Simultaneously the second base station device eNB2 keeps silent to avoid the interference of the control signal; or the controlling means 22 thereof transmits the same control signal as the first base station device eNB1 transmitted, which produces a certain gain of signal overlap.

Later, the transmitter 21 of the second base station device eNB2 transmits data information to UE in the preset subframe. Preferably, the transmitter 13 of the first base station device eNB1 transmits the same data information as sent by eNB2 to UE simultaneously, which produces a certain gain of signal overlap.

UE detects the data signal received by UE then restores the original information.

According to the embodiment of this aspect of the invention, two base station devices transmit controlling signaling and data information respectively, on occasion of synchronization and being controlled by one base station, users can receive data of another base station. One outstanding example is that the first base station obtains larger coverage for controlling signal by low-frequency carrier, while the second base station obtains larger throughput of data information by high-frequency carrier. It can be appreciated by those skilled in the art that this aspect of the invention is also applicable to two relay stations to send controlling signaling and data information respectively in the same way; and it is also applicable to a base station and a relay station to transmit controlling signaling and data information respectively.

As for relay technology, the invention provides a preferred technical solution specified by a fourth embodiment as below.

The Fourth Embodiment

Figure 4:
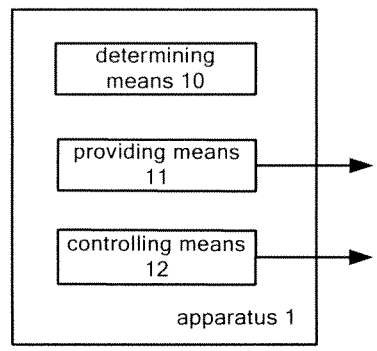
FIG. 4 is a block diagram based on another embodiment of the invention, which illustrates device 1 in eNB which collaborates with RN for relay communication with UE.
Figure 5:
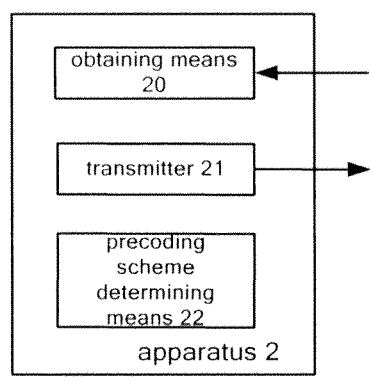
FIG. 5 is a block diagram based on another embodiment of the invention, which illustrates device 2 in RN which collaborates with eNB for relay communication with UE.

According to an embodiment of the invention, the relay process that the RN relays the data information from base station device eNB to UE is specified in detail as below. The first base station device eNB1 has apparatus 1 for communicating with UE in cooperation with RN, as illustrated in FIG. 4, the apparatus comprises a controlling means 12, and preferably further comprises a determining means 10 and a providing means 11. RN has an apparatus 2 for communicating with UE in cooperation with the eNB1, the apparatus comprises an obtaining means 20 and a transmitter 21, and preferably further comprises a precoding scheme determining means 22.

Firstly, by scheduling, the determining means 10 of eNB determines a preset subframe used by RN to transmit data information to UE, e.g. downlink subframe #2. Preferably, the determining means 10 further determines the subcarrier and time slot of downlink slot #2 which is used by RN to transmit data information to UE.

Later, via control channels e.g. PDCCH of base station device eNB, the providing means 11 transmits transmission instruction information to RN in downlink subframe #1, the transmission instruction information is as a result, scheduled by eNB, of the preset downlink subframe #2, subcarrier and time slot of data information transmitted by RN. It can be appreciated that information e.g. PDCCH, PHICH transmitted by base station device eNB is accompanied by CRS.

It can be appreciated that similarly to the third embodiment, by scheduling, a communication coordinating device also can determine the specific subframe which is used by RN to transmit data information to UE also, and inform the corresponding transmission instruction information to RN and inform the scheduling result to the base station device eNB.

Then, in the same subframe, the providing means 11 will transmit data information to RN through PDSCH which is accompanied by its CRS.

Simultaneously, the obtaining means 20 of RN receives transmission instruction information which was transmitted by base station device eNB and data information which will be transmitted to UE.

Later, in the next down link subframe #2, the controlling means 12 of base station device eNB will transmit controlling information e.g. SCH, BCH, PDCCH to UE directly. The PDCCH comprises instruction information which instructs UE to receive data information in some subcarrier and time slot of the present subframe. Moreover, PDCCH comprises instruction information which instructs UE to receive data information on the basis of User-specific Reference signals (abbreviated as USR). Simultaneously, RN keeps silent and does not allow transmission of CRS, PCDCH, SCH, BCH, etc; in another scenario, the controlling means 22 of RN transmits the same control signal as that transmitted by the first base station eNB1, which produces a certain gain of signal overlap.

Thus, after UE receives the controlling information which is transmitted by base station device eNB, UE will be aware that data information will be received on the basis of URS in some subcarrier and time slot of the downlink subframe #2.

The transmitter 21 of RN transmits data information to UE via the determined subcarrier and time slot in the downlink subframe #2, according to transmission instruction information provided by base station device eNB in down link subframe #1.

Specifically, for the purpose of correct estimation of the downlink channel from RN to UE which is executed by UE, RN transmits PDSCH which is used to carry data information via antenna port 5. Antenna port 5 is User-specific Reference Signals and a reference signal used for beam forming, all the present UEs are aware of the form of the reference signal in advance. Preferably, the apparatus 1 of the first base station eNB1 comprises transmitter 13, which transmits on the basis of URS the same data information to UE as that sent by RN simultaneously, to produce a certain gain of signal overlap. Preferably, the first base station device eNB1 keeps silent. Preferably, the first base station device eNB1 can serve for other users simultaneously to obtain gain of frequency reuse.

Thus, UE can estimate the channel from RN to UE accurately without any distortion of estimation, by receiving and measuring URS of PDSCH which is transmitted by RN. After the channel estimation, UE can demodulate and decode the data information of PDSCH better, then restore the original data successfully.

In the above embodiment, RN transmits the URS of antenna port 5, whereby UE carries out channel estimation for the downlink channel from RN to UE and then data information form RN to UE can be demodulated and decoded properly. In another scenario, RN counteracts the effect of the downlink channel from RN to UE by precoding data information instead of transmitting URS.

Because UE can measure the channel status, e.g. gain matrix $H_1$, from base station device eNB to UE by CRS which is transmitted by base station device eNB, in case RN makes s' become $H_1 \times s$ when s' reaches UE, wherein the s' will be generated by RN after RN processes original data information s; then UE which has already carried out proper estimation on $H_1$ can demodulate then obtain the original signal s.

In order to achieve the object, the transmitter 21 of RN can precode data information according to $H_1$ and the information of the second channel which is from RN to UE, the precoding scheme makes the signal of the data information received by UE represent the gain of the first channel. In an embodiment, transmitting signal s' can be defined by the following formula:

$$s' = ((H_2^{-1} \times H_1) \times s$$

Wherein $H_2$ denotes a channel gain matrix of the second channel, i.e. precoding matrix is $f_{precoding} = H_2^{-1} \times H_1$ Thus, after propagating in channels, data information received by UE is r:

$$r = H_2 \times S' + n = H_2 \times (H_2^{-1} \times H_1) \times s + n = H_1 \times s + n$$

Wherein, n denotes the noise of the second channel.

Preferably the transmitter 13 of the first base station eNB1 can transmit data signal s to UE simultaneously. UE will receive the signal of $r + H_1 \times s + n'$ whereby a certain gain of signal overlap is produced.

In an embodiment, the determining means 10 of base station device eNB comprises an obtaining means 100 which instructs UE to measure and transmit information $H_1$ of the first channel from base station device eNB to UE, then UE measures and obtains $H_1$ on the basis of CRS of base station device eNB. The providing means 11 of base station device eNB transmits the channel information $H_1$ as transmission instruction information to RN via PDCCH. The channel determining means 240 of determining means 23 of RN precoding scheme can estimate the uplink channel according to the uplink signal from UE to RN; and determines the information $H_2$ of the second channel from RN to UE on the basis of symmetry of channels. Then the determining means 24 of RN precoding scheme can ensure the precoding scheme $f_{precoding} = H_2^{-1} \times H_1$.

Similarly, in another embodiment, the determining means 10 of base station device eNB comprises the obtaining means 100 which obtains channel information $H_1$ measured by UE; the obtaining means 100 still instructs UE to compulsively measure signal quality of the second channel (specific subcarrier and time slot) to obtain $H_2$. In one scenario, the providing means 12 of base station eNB transmits $H_1$ and $H_2$ as transmission instruction information to RN, the precoding determining means 24 of RN calculates then obtains the precoding scheme $f_{precoding} = H_2^{-1} \times H_1$; in another scenario, base station device eNB calculates then obtains the precoding scheme $f_{precoding} = H_2^{-1} \times H_1$, and the precoding scheme $f_{precoding}$ will be transmitted to RN as transmission instruction information.

The detailed embodiments of the invention is specified above, it should be appreciated that the specific embodiments does not limit the invention, any variations and modifications can be carried out under the scope of the appended claims by those skilled in the art.

What is claimed is:

1. A method, in a first superior device, for communicating with a subordinate device, in cooperation with a second superior device, the method comprising:

sending controlling information directly to said subordinate device in a preset time unit, said controlling information instructing said subordinate device to receive data information at least from said second superior device in said preset time unit;

determining transmission instruction information for said second superior device to transmit said data information to said subordinate device, said transmission instruction information instructing said second superior device to transmit said data information to said subordinate device in said preset time unit; and providing said transmission instruction information for said second superior device.

2. The method according to claim 1, wherein the method is used for relaying, and said providing said transmission instruction information further comprises:

providing said data information for said second superior device.

3. The method according to claim 1, wherein said transmission instruction information further comprises information of subcarriers and/or time slots in said preset time unit, to be used by said second superior device to transmit said data information to said subordinate device; and said controlling information instructs said subordinate device to receive said data information on said subcarriers and/or time slots.

4. The method according to claim 1, wherein said controlling information further instructs said subordinate device to receive said data information based on user-specific reference signals.

5. The method according claim 1, wherein said determining transmission instruction information further comprises:

obtaining information of a first channel for transmission from said first superior device to said subordinate device, and information of a second channel for transmission from said second superior device to said subordinate device;

determining a precoding scheme for said second superior device to precode said data information, according to said information of said first channel and said information of said second channel, and said transmission instruction information comprises said precoding scheme.

6. The method according claim 5, wherein said precoding scheme makes signals of said data information, received by said subordinate device, to represent gains of said first channel.

7. The method according to claim 1, wherein said controlling information comprises repeat indicating information, and/or synchronization information, and/or broadcast information, and/or packet data controlling information, and said sending controlling information comprises:

sending said cell-specific reference signals together with said controlling information to said subordinate device.

8. A method, in a second superior device, for communicating with a subordinate device, in cooperation with a first superior device, the method comprising:

obtaining transmission instruction information, which instructs said second superior device to transmit data information to said subordinate device in a preset time unit;

keeping silent, or sending same controlling information as that sent by said first superior device, when said first superior device sends controlling information to said subordinate device in said preset time unit; and transmitting said data information to said subordinate device in said preset time unit;

wherein the method is used for relaying, and said obtaining transmission instruction information comprises receiving said data information from said first superior device and wherein said transmission instruction information further comprises information of subcarriers and/or time slots in said preset time unit, used by said second superior device to transmit said data information; and said transmitting said data information comprises transmitting said data information to said subordinate device on said subcarriers and/or said time slots.

9. The method according to claim 8, wherein said obtaining transmission instruction information comprises:

receiving said transmission instruction information from said first superior device.

10. The method according to claim 8, wherein said transmitting said data information further comprises:

transmitting signals of said data information together with user-specific reference signals to said subordinate device.

11. The method according to claim 8, wherein the method further comprises:

determining a precoding scheme for precoding said data information;

and said transmitting said data information further comprises:

precoding said data information according to said precoding scheme, before transmitting said data information.

12. The method according to claim 11, wherein said precoding scheme makes said signals of said data information, received by said subordinate device, to represent gains of a first channel, wherein said transmission instruction information comprises information of said first channel, and said determining a precoding scheme further comprises:

determining information of a second channel according to information of a channel for transmission from said subordinate device to said second superior device; and determining said precoding scheme for said second superior device to precode said data information, according to said information of said first channel and said information of said second channel.

13. A method, in a first superior device, for communicating with a subordinate device, in cooperation with a second superior device, the method comprising:

determining transmission instruction information for said second superior device to transmit said data information to said subordinate device, said transmission instruction information instructing said second superior device to transmit said data information to said subordinate device in said preset time unit;

providing said transmission instruction information and said data information for said second superior device; and sending controlling information directly to said subordinate device in a preset time unit, said controlling information instructing said subordinate device to receive data information at least from said second superior device in said preset time unit, wherein said controlling information further instructs said subordinate device to receive said data information based on user-specific reference signals.

\* \* \* \* \*